United States Patent
Conard et al.

(10) Patent No.: US 12,374,235 B2
(45) Date of Patent: Jul. 29, 2025

(54) INGRESS PROTECTED BRAILLE DISPLAY

(71) Applicant: Freedom Scientific, Inc., Clearwater, FL (US)

(72) Inventors: Todd Conard, Ruskin, FL (US); Walter van Tujil, Rotterdam (NL); Patrick Murphy, North Redington Beach, FL (US); Maarten van Egmond, Rijnsburg (NL)

(73) Assignee: ENHANCED VISIONS SYSTEMS, INC., Clearwater, FL (US)

( * ) Notice: Subject to any disclaimer, the term of this patent is extended or adjusted under 35 U.S.C. 154(b) by 573 days.

(21) Appl. No.: 17/668,034

(22) Filed: Feb. 9, 2022

(65) Prior Publication Data
US 2023/0252911 A1    Aug. 10, 2023

(51) Int. Cl.
    G09B 21/00    (2006.01)
(52) U.S. Cl.
    CPC .................. G09B 21/004 (2013.01)
(58) Field of Classification Search
    CPC .... G09B 21/001; G09B 21/02; G09B 21/003; G09B 21/008; G09B 21/004
    See application file for complete search history.

(56) References Cited

U.S. PATENT DOCUMENTS

| | | | | |
|---|---|---|---|---|
| 4,074,088 A | * | 2/1978 | Keough | H01H 13/7006 174/262 |
| 5,164,553 A | * | 11/1992 | Kitahara | H01H 13/7006 200/302.2 |
| 5,466,154 A | * | 11/1995 | Thompson | G09B 21/003 434/114 |
| 6,354,839 B1 | | 3/2002 | Schmidt et al. | |
| 6,743,021 B2 | | 6/2004 | Prince et al. | |
| 7,462,034 B1 | * | 12/2008 | Murphy | G09B 21/003 434/112 |
| 10,127,832 B2 | * | 11/2018 | Moon | G09B 21/004 |
| 2009/0023116 A1 | * | 1/2009 | Shaw | G09B 21/004 434/114 |
| 2009/0095611 A1 | * | 4/2009 | Villain | H01H 25/041 200/5 A |
| 2017/0352291 A1 | * | 12/2017 | Kim | G09B 21/004 |
| 2018/0214779 A1 | * | 8/2018 | Tran | A63F 13/25 |
| 2018/0342176 A1 | * | 11/2018 | Californiaa | G09B 21/04 |
| 2019/0304340 A1 | * | 10/2019 | Bailey | B41M 3/16 |
| 2020/0105163 A1 | * | 4/2020 | Seo | G09B 21/003 |
| 2020/0294419 A1 | * | 9/2020 | Belomoev | G06F 3/0219 |
| 2021/0134183 A1 | * | 5/2021 | Moon | G06F 3/0393 |
| 2021/0287569 A1 | * | 9/2021 | Moon | G09B 21/004 |
| 2021/0295739 A1 | * | 9/2021 | Moon | G09B 21/004 |

* cited by examiner

*Primary Examiner* — Milap Shah
(74) *Attorney, Agent, or Firm* — Dennemeyer & Associates LLC

(57) ABSTRACT

Disclosed is a Braille display with protection against the ingress of contaminants. In one embodiment, contaminant protection is provided by a flexible film that is secured beneath the Braille dots of the display. This film both secures the dots and prevents contaminants from coming into contact with pin actuators within the display housing. In another embodiment, ingress protection is provided by air pressure supplied to a plenum located at the base of the dot pins.

7 Claims, 7 Drawing Sheets

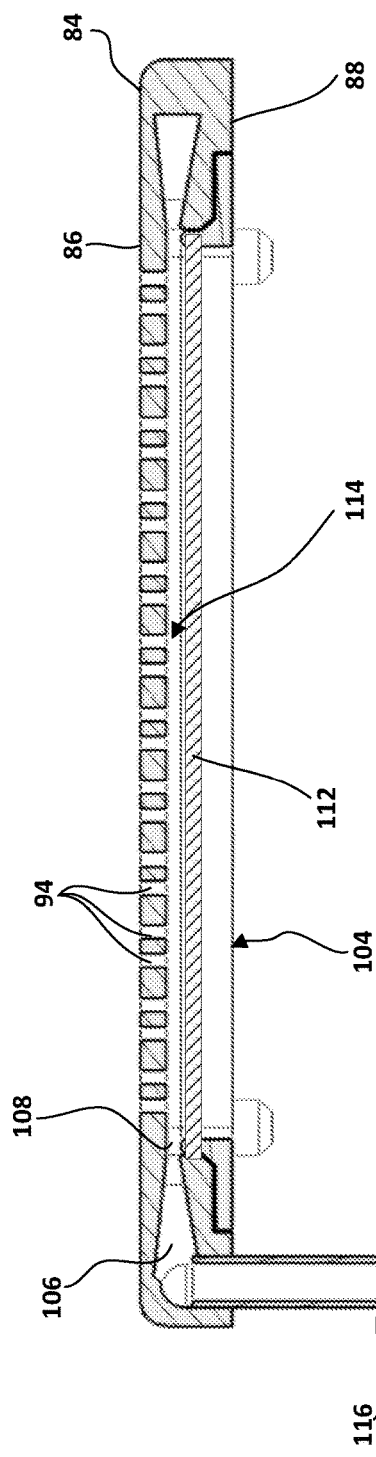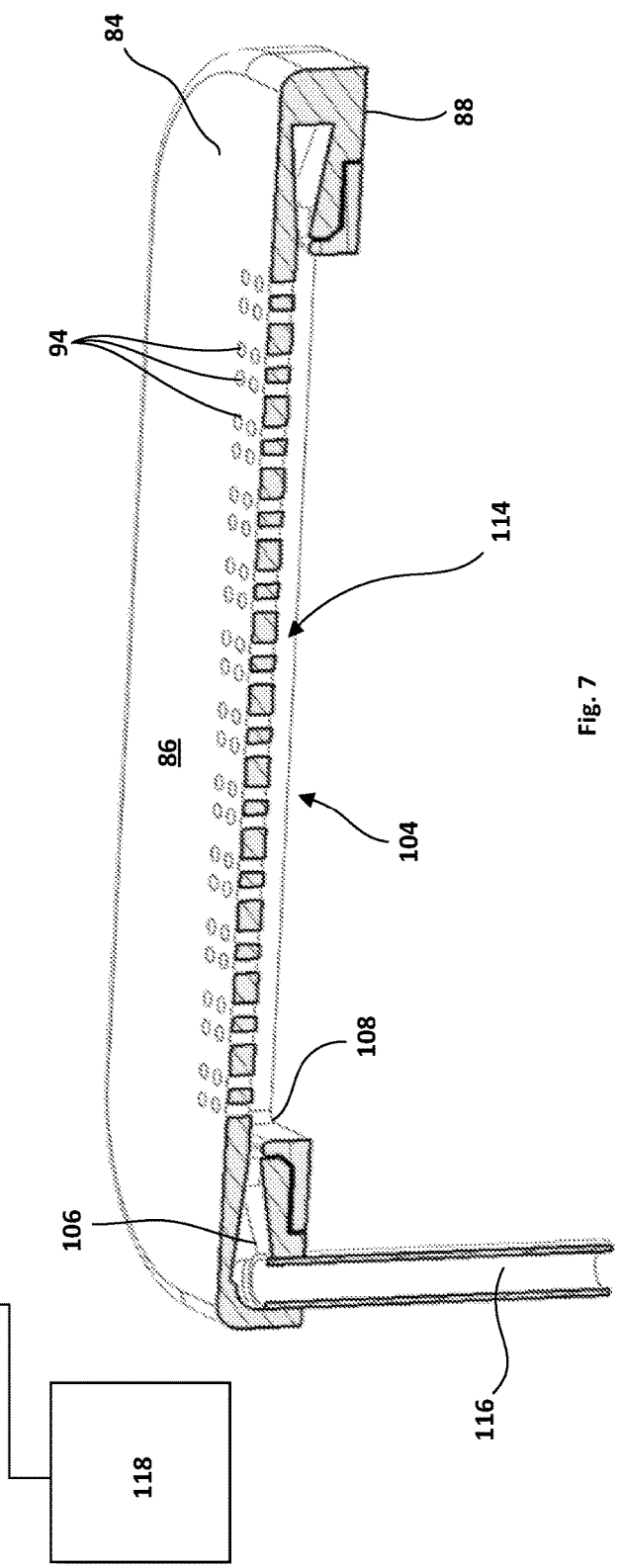

INGRESS PROTECTED BRAILLE DISPLAY

TECHNICAL FIELD

This disclosure relates to a Braille display. More specifically, the present disclosure relates to a Braille display with various features for preventing the ingress of contaminants.

BACKGROUND OF THE INVENTION

A Braille display is a device that allows blind or low vision users to read text. These displays typically include one or more lines, with each line comprising individual tactile cells. A typical display may include 20, 40, or even 80 cells. Each cell, in turn, contains six or eight tactile pins that move up and down with respect to a surrounding Braille deck. The tactile pins can be driven by mechanical, electromechanical, piezoelectric, pneumatic, magnetic, or electromagnetic effects. When in the raised position, the pins extend above the deck and can be felt by a user. By raising certain pins and keeping others below the deck surface, individual Braille characters can be generated. A series of cells together represent a line of text. After a line has been read the user can refresh the display to allow for additional lines to be presented and read. Certain types of displays may present multiple lines of Braille text at a time. Braille displays are often combined with other hardware and software to make up an integrated unit.

Braille displays are sensitive pieces of equipment that are prone to being damaged by contaminants. These contaminants can be, for example, dust, dirt or airborne particles that gain entry into the display by way of apertures associated with the tactile pins. Braille displays can also be damaged by foods or liquids, as may occur if the user is reading the display while eating or drinking. Regardless of how it occurs, any intrusion into the Braille display can harm sensitive components, such as actuator assemblies, tactile pins, circuit boards, or associated electrical components. Because these components have especially tight tolerances, even the smallest of particles can cause serious damage. This damage may render the display unusable and require expensive repairs.

Over the years efforts have been made to protect the components associated with Braille displays. As example of one such effort is disclosed in U.S. Pat. No. 6,743,021 to Prince et al. Prince discloses a refreshable Braille display with an outer, flexible surface. More specifically, Prince discloses the use of a flexible, compliant polymer material that is stretched over the top of the housing associated with a Braille display. This flexible layer creates a continuous surface and offers environmental protection to associated electronics.

Similarly, U.S. Pat. No. 6,354,839 to Schmidt et. al. discloses a refreshable Braille display system. The display includes a single sheet of a polymer material that is stretched over top of the Braille display. This gives the display a continuous surface and protects associated microelectromechanical devices.

Although the Prince and Schmidt devices each achieve their own unique and important objectives, they both suffer from common drawbacks. Namely, both devices achieve some limited degree by environmental protection by adhering a material over top of the associated Braille dots. Doing so drastically alters the user's tactile interaction with the display. This can be a significant drawback for blind/low vision users, as often their only interaction with the display is through their fingertips. Braille dots are designed to provide users with a distinct, satisfying, and clear feel. This tactile interaction allows users to easily read the display and distinguish between various Braille characters. Displays such as Prince and Schmidt interfere with this tactile experience by interposing a material layer between the user's finger tips and the Braille dots.

What is needed, therefore, is a refreshable Braille display that protects internal components from the ingress of contaminants, while at the same time preserving the tactile feel of the Braille dots. The Braille display of the present disclosure is designed to fulfill these and other shortcomings present in the art.

SUMMARY OF THE INVENTION

This disclosure relates to various ingress protected Braille displays.

One disclosed display includes a film sheet that is positioned beneath the dot pins to prevent contaminants from damaging sensitive display components.

An advantage of this film sheet is realized by positioning it to both protect the display and secure the dot pins.

Another advantage is realized by positioning the sheet over top of an associated actuator assembly to prevent contaminants from accessing the internal components of the assembly.

Another advantage is realized by providing a plenum in the display housing and coupling the plenum to a fluid source.

This arrangement applies a source of pressurized air to the dot pin openings, which advantageously ejects any contaminants and also prevents the entry of any contaminants.

An advantage of the present disclosure is that it protects the internal components of a Braille display without sacrificing the feel of the dot pins.

Various embodiments of the invention may have none, some, or all of these advantages. Other technical advantages of the present invention will be readily apparent to one skilled in the art.

BRIEF DESCRIPTION OF THE DRAWINGS

For a more complete understanding of the present disclosure and its advantages, reference is now made to the following descriptions, taken in conjunction with the accompanying drawings, in which:

FIG. 6 is a sectional view taken along line 6-6 of FIG. 4.

FIG. 7 is a perspective, sectional view of the of the upper display housing of the alternative embodiment.

Similar reference numerals refer to similar parts throughout the several views of the drawings.

Parts List

| | |
|---|---|
| 10 | Braille Display |
| 20 | Upper Display Housing |
| 22 | Inner Surface of Upper Housing |
| 24 | Outer Surface of Upper Housing |
| 26 | Opening in Upper Housing |
| 28 | Braille Deck |
| 32 | Dot Openings in Braille Deck |
| 34 | Dot Pins |
| 36 | Upper End of Dot Pin |
| 38 | Lower End of Dot Pin |
| 42 | Flexible Sheet |
| 44 | Upper Surface of Sheet |
| 46 | Lower Surface of Sheet |
| 52 | Indentations in Sheet |
| 54 | Lower Display Housing |
| 56 | Display Housing Assembly |
| 58 | Actuator Assembly |
| 62 | Pin Actuators |
| 72 | Braille display |
| 74 | Housing |
| 76 | Actuator Assembly |
| 78 | Microprocessor |
| 80 | Pin Actuators |
| 82 | Top Plate |
| 84 | Braille Deck |
| 86 | Upper Surface Braille Deck |
| 88 | Lower Surface Braille Deck |
| 92 | First End Braille Display |
| 94 | Dot Openings |
| 96 | Dot Pins |
| 98 | Upper Surface Dot Pin |
| 102 | Lower Base Dot Pin |
| 104 | Recess Lower Surface Braille Deck |
| 106 | Pneumatic Chamber |
| 108 | Openings Pneumatic Chamber |
| 112 | Flexible Sheet |
| 114 | Plenum |
| 116 | Pneumatic Channel |
| 118 | Source of Pressurized Air |
| 120 | Cross Vents |
| 122 | Side Vents |

DETAILED DESCRIPTION OF THE DRAWINGS

The present disclosure relates to a Braille display with protection against the ingress of contaminants. In one embodiment, contaminant protection is provided by a flexible film that is secured beneath the Braille dots of the display. This film both secures the dots and prevents contaminants from coming into contact with pin actuators and other components within the display housing. In another embodiment, ingress protection is provided by fluid pressure supplied to a plenum located at the base of the dot pins. Both of these embodiments are described in greater detail hereinafter.

Ingress Protection Barrier

Figure 1:
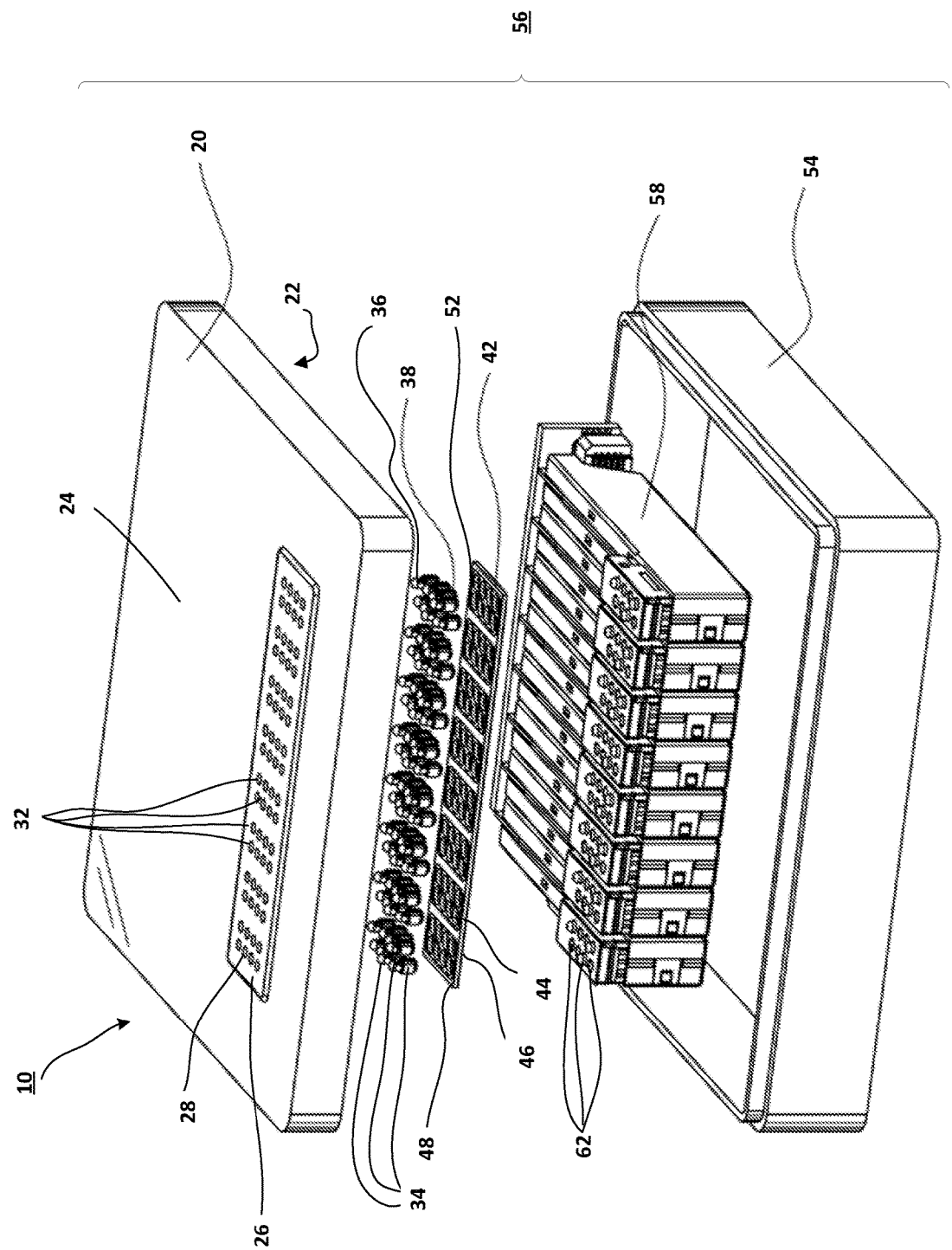
FIG. 1 is an exploded view of the Braille display of the present disclosure.

FIG. 1 is an exploded view of the refreshable Braille display of the present disclosure. Display (10) includes an upper housing (20) that includes generally planar inner and outer surfaces (22, 24). Upper housing (20) further includes a rectangular cut out (26) that is dimensioned to receive a Braille deck (28). Braille deck (28) is the component that the user interacts with when reading the display. The Braille deck (28) includes a series of pin openings (32) into which dot pins (34) are received. Although the depicted Braille deck (28) is rectangular the use of other shapes and configurations is within the scope of the present disclosure. The present disclosure is not limited to the deck (28) and housing (20) arrangement illustrated in FIG. 1, as any of a variety of Braille display arrangements would benefit from the ingress protection described herein.

In the depicted embodiment, a sufficient number of dot pins (34) are included to provide for eight different refreshable Braille characters, with each individual character including eight FIG. 1. However, the present disclosure is not limited to any specific number of Braille characters or pin arrangements. A lower housing (54) is releasably secured to the upper housing (20) so as to form the enclosure assembly (56) of device (10). The upper and lower housings (20, 54) can be secured together in any of a variety of ways known in the art.

The dot pins (34) are slidably received within corresponding pin openings (32) formed within the Braille deck (28). Each dot pin (34) is defined by an upper end (36) and a lower base (38). The pins (34) can be raised such that the upper ends (36) of selected dot pins (34) are selectively positioned above the surface Braille deck (28). This allows the upper ends (36) to be touched, or read, by the user's finger tips. Conversely, each dot pin (32) can be selectively lowered below the surface of the Braille deck (28). In this way, individual Braille characters can be formed along the length of the Braille deck (28). The movement of the individual dot pins (34) is achieved via an actuator assembly (58) and an associated microprocessor (not shown) positioned within the lower display housing (54).

With continuing reference to FIG. 1, a film (42) is secured within the interior of the enclosure assembly (56) to form a physical barrier against the ingress of contaminants. Notably, this barrier is positioned below and not above the dot pins (34). In a preferred but non-limiting embodiment, film (42) is formed from a 20 micron thin sheet of ELASTOSIL® Film. ELASTOSIL® is a silicon film manufactured by Wacker Chemie AG of Munich, Germany. However, other thin, flexible, and impermeable films may also suffice.

Film (42) includes upper and lower surfaces (44, 46) and a peripheral extent (48). It optionally includes a series of indentations (52), with the indentations (52) corresponding to the position and arrangement of the dot pins (34) associated with display (10). As illustrated, a portion of the peripheral extent (48) of the film (42) is secured to the upper housing (20). More specifically, film (42) can be secured via screws, fasteners, or adhesives to the underside of the Braille deck (28). In the preferred embodiment, the peripheral extent of film (42) is secured to the bottom of Braille deck (28) via a pressure sensitive adhesive. However, it is also within the scope of the present disclosure to use a larger piece of film (42) such that its peripheral extent extends beyond the Braille deck (28) and is adhesively adhered to the inner surface (22) of housing (20).

When properly positioned, the upper surface (44) of the film (42) is secured to the Braille deck (28) and contacts the lower ends (38) of the dot pins (34). By positioning film (42) in this fashion, dot pins (34) are restrained and prevented from being removed from the associated pin openings (32). This positioning also allows upper housing (20) to be removed from the lower housing (54) for servicing the device (10) without disturbing the positioning of the pins (34). Film (42) also prevents any contaminants that have entered the pin openings (32) from contacting the lower pin actuators (58) or other sensitive internal components. Importantly, this is accomplished without otherwise disrupting the user's tactile feel of the dot pins (34).

Figure 2:
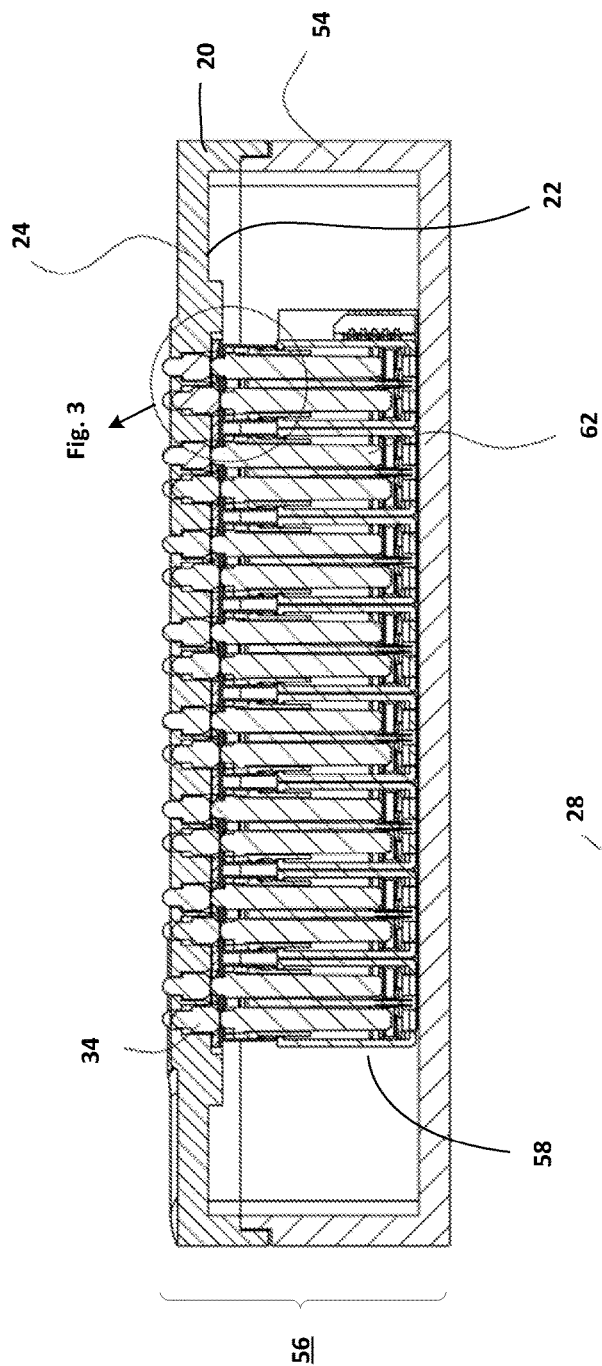
FIG. 2 is a sectional view of the Braille display of the present disclosure.

The actuator assembly (58) is illustrated in FIGS. 1 and 2. The depicted actuator assembly (58) electromechanically raises or lowers the associated dot pins (34) in accordance with instructions from the microprocessor. However, those of ordinary skill in the art will appreciate that a variety of different types of actuator assemblies can be used in connection with the present disclosure. For example, assembly (58) can drive the tactile pins (34) using mechanical, electromechanical, piezoelectric, pneumatic, magnetic, or electromagnetic mechanisms. Regardless of the mechanism employed, actuator assembly (58) includes a series of pin actuators (62), with the number of pin actuators (62) corresponding to the number and position of dot pins (34). Thus, each pin actuator (62) is associated with and drives a corresponding dot pin (34) upwardly or downwardly in accordance with instructions from a microprocessor. In this manner, the pin actuators (62) selectively raise or lower the dot pins (34) to form Braille characters. As illustrated, the pin actuators (62) are in contact with the lower surface (46) of the film (42) and therefore drive the dot pins (34) via contact with film (42).

Pneumatic Ingress Protection

FIGS. 4-9 illustrate an alternative, pneumatic embodiment of the ingress protected Braille display. The particular embodiment disclosed is for use in connection with a kiosk or other stand-alone type of Braille display. However, those of ordinary skill will appreciate that the ingress protection offered by this alternative embodiment can be incorporated into other types of Braille displays, such as portable Braille readers or tablets.

Figure 3:
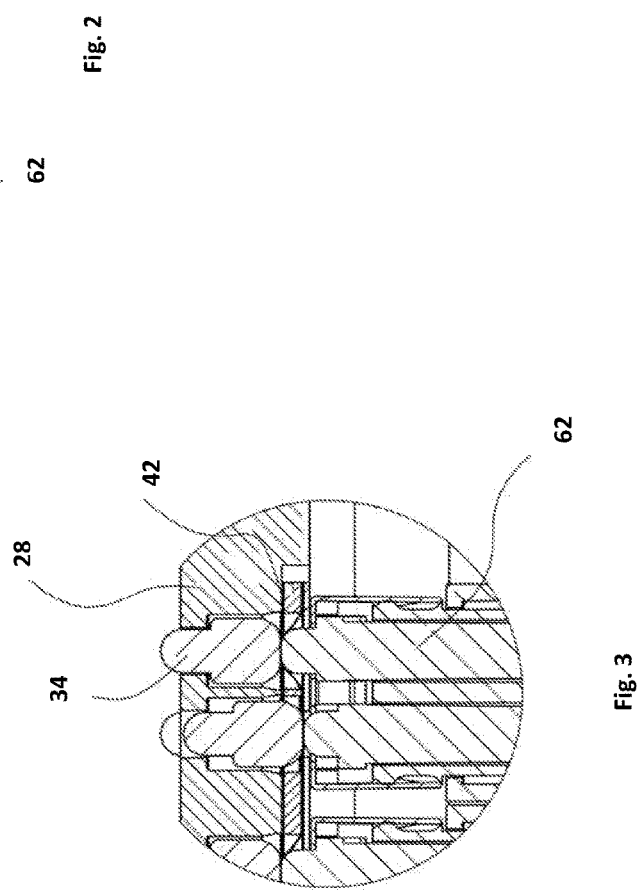
FIG. 3 is a detailed view taken from FIG. 2.
Figure 5:
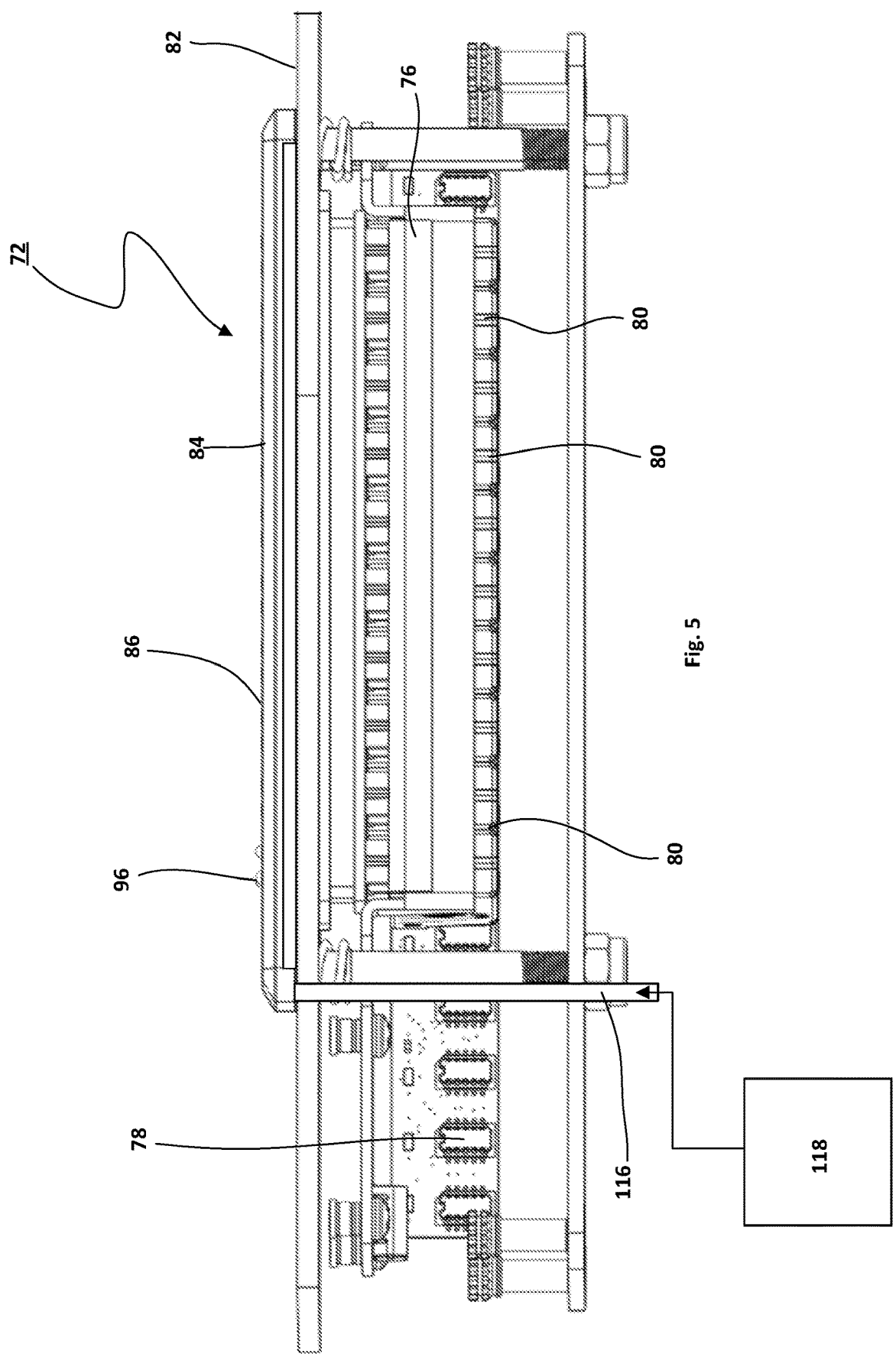
FIG. 5 is a side sectional view of the alternative embodiment employing pneumatic ingress protection.

The pneumatic ingress protection display (72) includes a housing (74) for storing an actuator assembly (76) and an associated microprocessor (78) (FIG. 5). As in the embodiment of FIGS. 1-3, this actuator assembly (76) consists of a series of pin actuators (80) that are selectively activated in accordance with instructions from a microprocessor (78). Again, these pin actuators (80) can be driven via various mechanical, electro-mechanical, magnetic, or electro-magnetic means.

Figure 4:
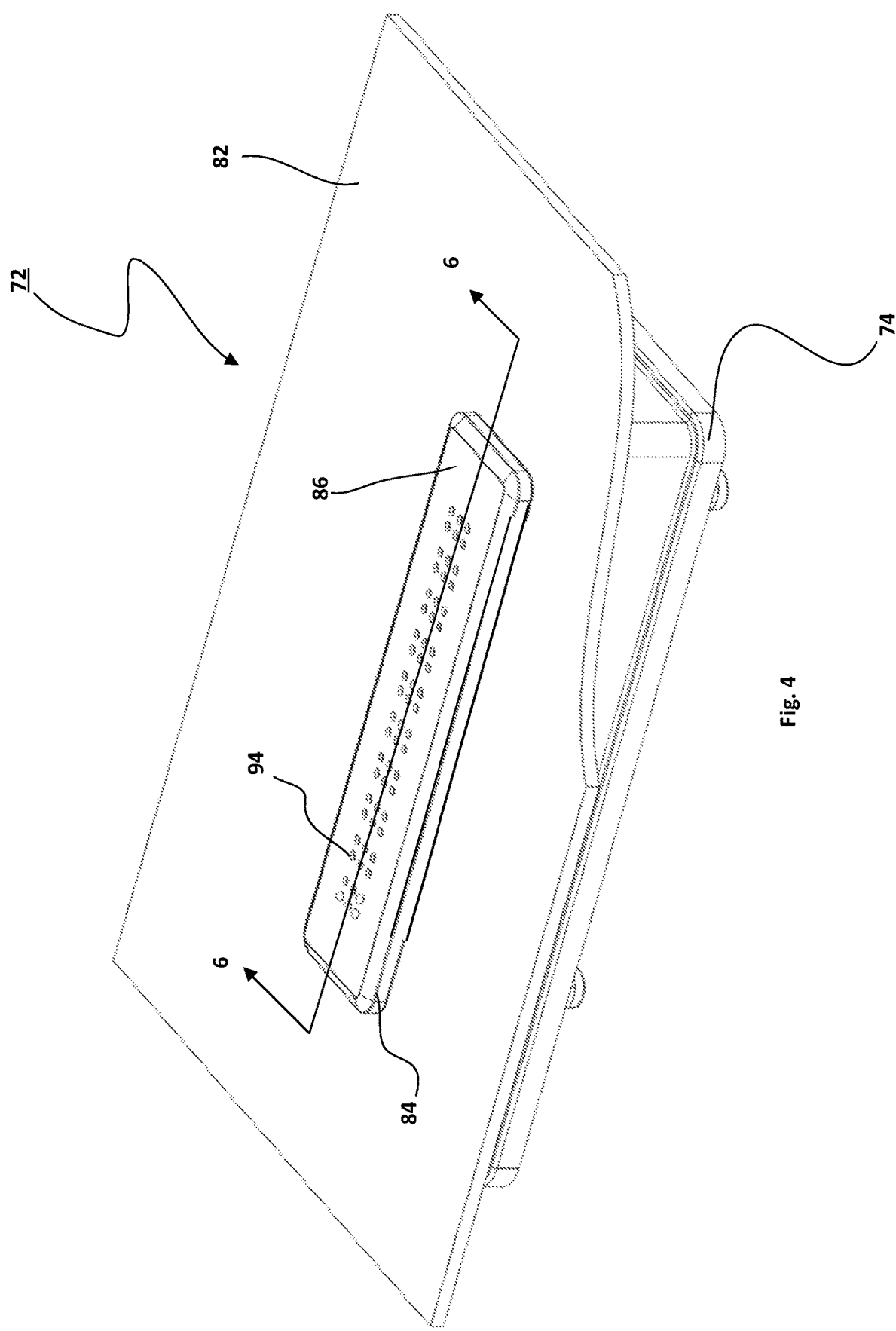
FIG. 4 is a top perspective view of an alternative embodiment employing pneumatic ingress protection.

With reference to FIGS. 4-5, the display (72) includes a top plate (82) that is interconnected to the housing (74) and that surrounds a Braille deck (84). Although the depicted arrangement is preferred for a Braille kiosk, other arrangements can be employed depending upon the anticipated use of the display. The Braille deck (84) is positioned within an opening in the top plate (82). Braille deck (84) includes an upper surface (86) that the blind/low vision user interacts with. As most clearly illustrated in FIGS. 6-7, a lower surface (88) (i.e. the surface opposite to upper surface (86)) includes a recessed area (104).

Braille deck (84) further includes opposing ends, with one of the ends (92) housing a pneumatic chamber (106). The purpose of this chamber is described below. A series of dot openings (94) are formed through the Braille deck (84) with these openings slidably receiving a series of corresponding dot pins (96). Each dot pin (96), in turn, includes an upper surface (98) that is adapted to be felt by the user and a lower base (102). Each lower base (102) is adapted to be driven by a pin actuator (80). Thus, dot pins (96) collectively correspond to, and are driven by, the pin actuators (80).

Figure 8:
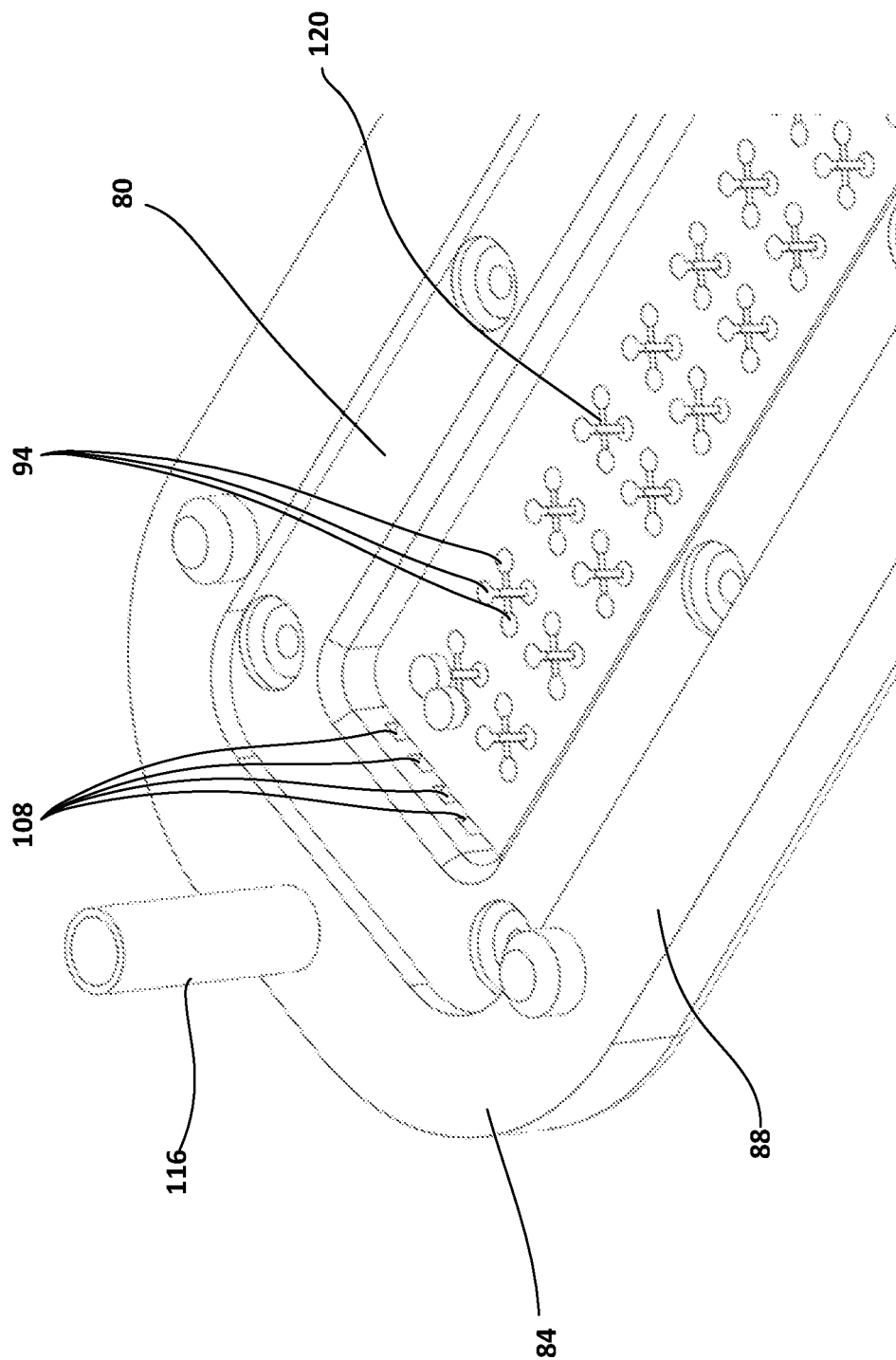
FIG. 8 is a perspective view of the inner surface of the upper display housing of the alternative embodiment.
Figure 9:
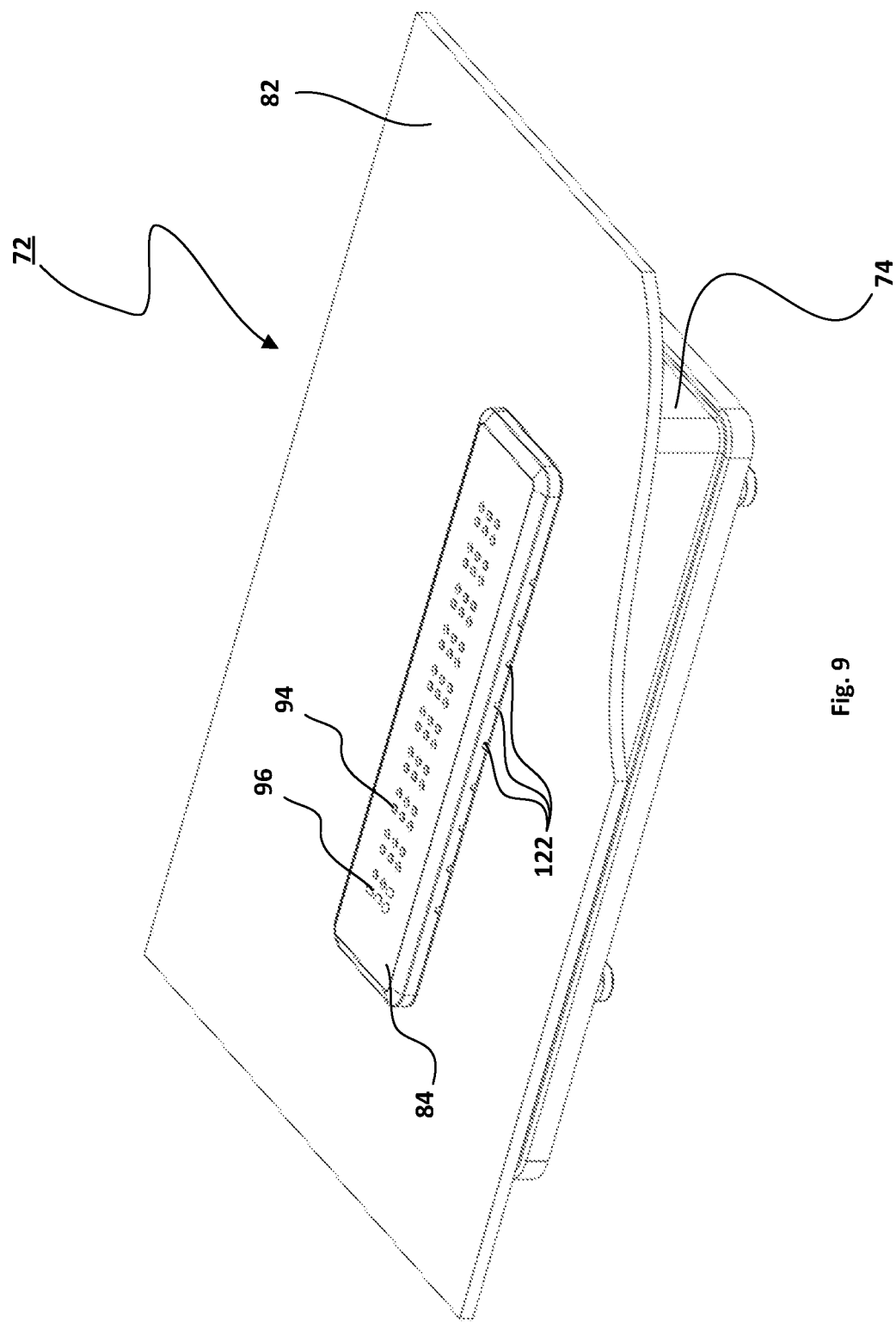
FIG. 9 is another alternative embodiment employing side mounted drain ports.

A flexible sheet (112) positioned within and secured to recess (104) within the lower surface (88) of the Braille deck (84). As in the prior embodiment, flexible sheet (112) is preferably formed from a 20 micron thin sheet of ELASTOSIL® Film. ELASTOSIL® is a silicon film manufactured by Wacker Chemie AG of Munich, Germany. However, other thin, flexible, and impermeable films may also suffice. As illustrated, film (112) is dimensioned to be received within the recess (104) within the lower surface (88) of the Braille deck (84). Film (112) is preferably secured in place via a pressure sensitive adhesive. However, other types of adhesives as well as mechanical fasteners can also be used. When properly secured, film (112) is in contact with the lower bases (102) of the dot pins (96). Film (112) also acts has a physical barrier by preventing contaminants from accessing the actuator assembly (76). Furthermore, film (112) forms a plenum (114) adjacent the lower surface (88) of the deck (84). As best illustrated in FIG. 8, plenum (114) is in fluid communication with pneumatic chamber (106) via a series of openings (108). Plenum (114) is also in fluid communication with the dot pin openings (94) within the Braille deck (84).

With reference to the cross sectional view of FIG. 6, a pneumatic channel (116) is illustrated that extends from a source of pressurized air (118) to the pneumatic chamber (106) formed within the first end (92) of the Braille deck (84). This source of pressurized air (118) supplies air under pressure to the pneumatic channel (116), the pneumatic chamber (106), the plenum (114), and ultimately the dot openings (94). Although pressurized air has been disclosed, it is understood that other working fluids can alternatively be employed. Thus, in use, pressurized air from air source (118) is ultimately delivered to the dot openings (94) to thereby pneumatically eject any foreign particles within openings (94) and otherwise preclude foreign particles from gaining access to openings (94). This, in turn, serves to protect the sensitive components associated with the actuator assembly (76).

In order to ensure proper air flow and that none of the dot pins (96) get pneumatically stuck in a raised position, various vents can be incorporated into the display (72). For example, FIG. 8 illustrates cross vents (120) extending between adjacent dot pin openings (94). This allows any pressurized air to quickly escape from the openings (94) and thereby allow the associated dot pins (96) to slide downwardly in accordance with instructions from the microprocessor (78). This venting can likewise be accomplished via side vents (122) present on the sides of the Braille deck (84).

Although this disclosure has been described in terms of certain embodiments and generally associated methods, alterations and permutations of these embodiments and methods will be apparent to those skilled in the art. Accordingly, the above description of exemplary embodiments does not define or constrain this disclosure. Other changes, substitutions, and alterations are also possible without departing from the spirit and scope of this disclosure.

What is claimed is:

1. A Braille display with ingress protection, the Braille display comprising:
    an upper housing including a planar inner and outer surfaces, the upper housing including a deck opening;
    a deck positioned within the deck opening of the upper housing, the deck includes a series of pin openings;
    a series of dot pins, the dot pins having an orientation and with each dot pin including upper and lower ends, each dot pin being slidably received within a corresponding pin opening;
    an film having upper and lower surfaces, a peripheral extent, and a series of indentations, with the orientation of the indentations corresponding to the orientation of the dot pins, a portion of the peripheral extent of the film being secured to the inner surface of the upper housing, the upper surface of the film being in contact with the dot pins and preventing the dot pins from being removed from the pin openings;
    a lower housing releasably secured to the upper housing so as to form an enclosure;
    an actuator assembly positioned within the lower housing, the actuator assembly includes a series of pin actuators, with each pin actuator being associated with a corresponding dot pin, the pin actuators selectively raising or lowering the dot pins to form Braille characters, the pin actuators being in contact with the lower surface of the film;

wherein the film prevents any contaminants that have entered the pin openings from contacting the pin actuators.

2. The Braille display as described in claim 1 wherein the film is a flexible, polymeric film.

3. The Braille display as described in claim 1 wherein the pin actuators are in contact with the lower surface of the film.

4. The Braille display as described in claim 1 wherein the pin actuators are electromechanically operated.

5. The Braille display as described in claim 1 wherein the pin actuators are magnetically actuated.

6. The Braille display as described in claim 1 wherein each dot pin includes an upper end that can be selectively exposed to the user to form part of a Braille character.

7. The Braille display as described in claim 1 wherein a peripheral extent of the film is secured to an underside of the Braille deck.

* * * * *